June 4, 1940.  G. A. CARLSON  2,203,488
POLISHING AND BUFFING MACHINE
Filed June 30, 1938    2 Sheets-Sheet 1
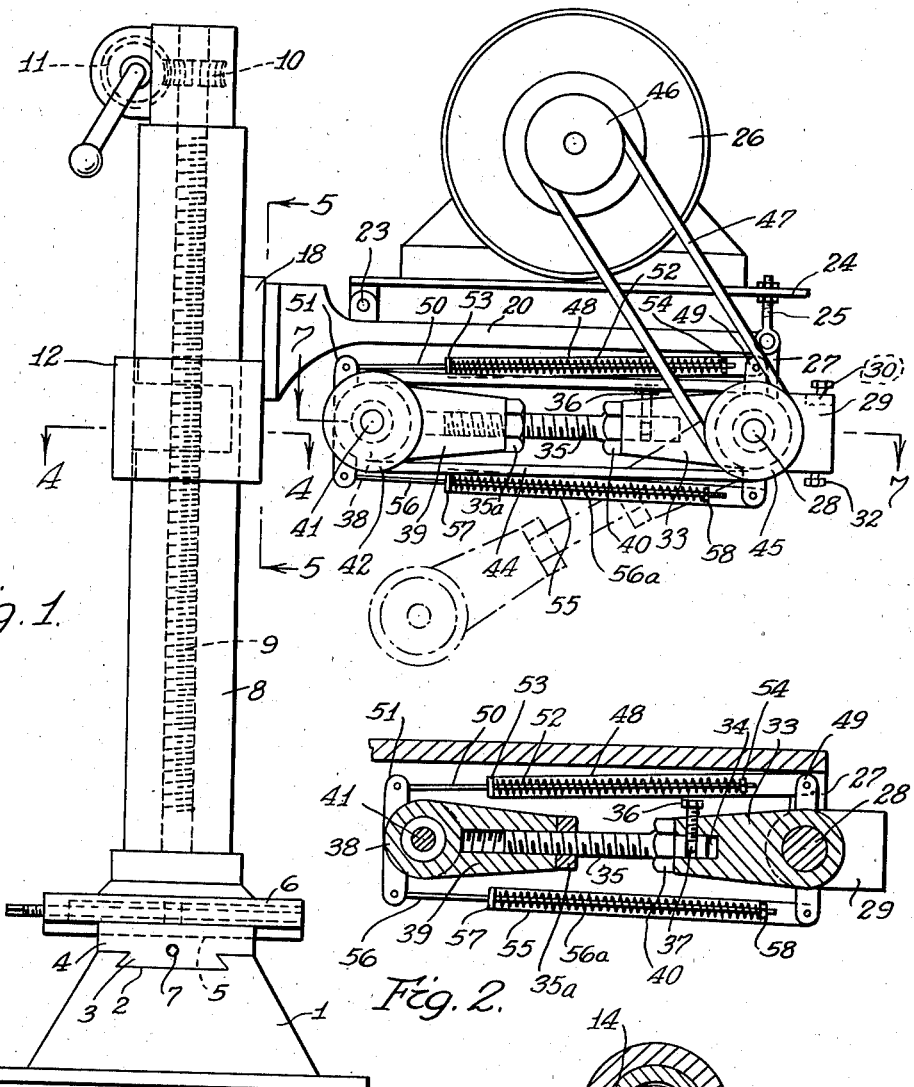
Fig. 1.
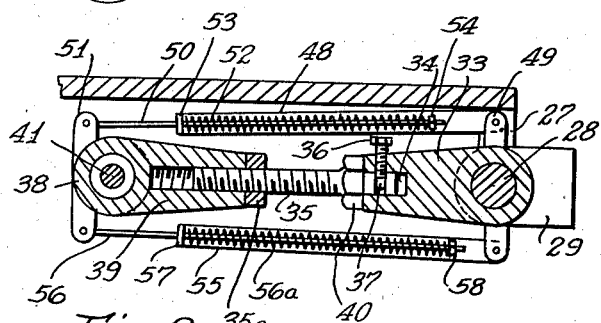
Fig. 2.
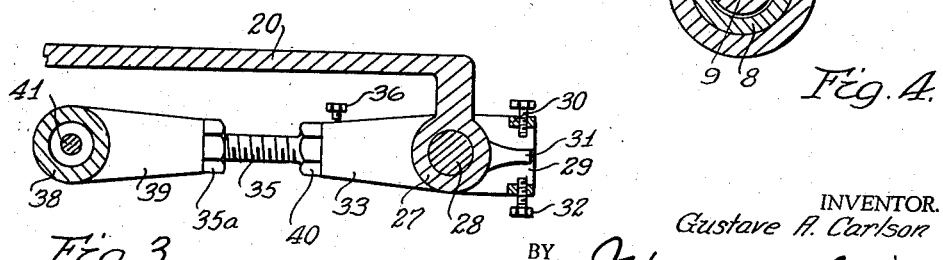
Fig. 3.
Fig. 4.
INVENTOR.
Gustave A. Carlson
BY
ATTORNEY.

June 4, 1940.                    G. A. CARLSON                    2,203,488
                        POLISHING AND BUFFING MACHINE
                    Filed June 30, 1938          2 Sheets-Sheet 2

INVENTOR.
Gustave A. Carlson
BY
ATTORNEY.

Patented June 4, 1940

2,203,488

UNITED STATES PATENT OFFICE 2,203,488

POLISHING AND BUFFING MACHINE

Gustave A. Carlson, Detroit, Mich.

Application June 30, 1938, Serial No. 216,696

8 Claims. (Cl. 51—166)

This invention relates to polishing and buffing machines and has for its primary object to provide a machine for grinding, polishing or buffing objects in production, as said objects are fed thereto by conveying apparatus.

Another object is to provide a polishing and buffing machine including a rotary tool of substantial weight of improved sensitiveness for following irregular surfaces of the objects being worked upon, while maintaining a uniform working pressure on the work objects during such shifting. In this connection, the tool carrying spindle is supported upon the free end of a pivoted arm, and counterbalancing means acts upon said arm whereby the pressure of the tool on the work remains substantially uniform during pivoting of the arm.

Another object is to provide a machine embodying a shiftable support for a tool spindle, counterbalanced as above referred to, and means for supporting the tool spindle support, the counterbalancing means and the motor for driving the spindle whereby the entire unit may be adjusted horizontally, vertically and also angularly with respect to the horizontal. Such adjustments enable use of the same polishing and buffing unit with different types of work conveyors, and enables adjustment to accommodate the machine to work objects of widely varying shapes.

In prior machines of this character shifting of the tool spindle is usually accompanied with shifting of the spindle operating motor, with the result that shifting movements are sluggish due to the comparatively great weight being moved. This, of course, requires slower movement of the work objects as they are continuously fed to and past the machine. It is an object of this invention to support the operating motor whereby the spindle supporting arm is free from the weight thereof, and to thereby reduce the inertia whereby the wheel responds to the contour of more rapidly moving work.

It is also to be noted that prior machines of this character are usually constructed with the wheel spindle and motor out of balance with respect to their pivotal mounting, in order that gravity acting thereon supplies the necessary pressure between the wheel and the work. This also results in sluggish movement and has a further disadvantage in that as the mass shifts with respect to its pivot the pressure of the wheel on the work piece varies. Accordingly it is an object of this invention to provide means for counter balancing the spindle support and adjustable means for regulating the pressure of the wheel on the work object. In other words, the spindle is not dependent upon the effects of gravity, and the pressure of the wheel on the work is definitely regulated and maintained proper for any given operation.

Other objects relate to the desirable features of construction of the machine whereby, for example, the several adjustments necessary to accommodate different work objects may be readily made, the manner in which the motor is mounted and operatively connected to the tool spindle, and the means for maintaining the motor and spindle belts tightened.

In the accompanying drawings

Fig. 1 is a side elevation of the machine;

Figs. 2 and 3 are vertical sections illustrating details;

Fig. 4 is a section taken on the line 4—4 of Fig. 1;

Figure 5:
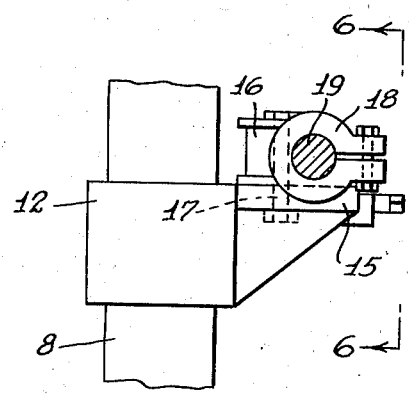
Fig. 5 is a section taken on the line 5—5 of Fig. 1.
Figure 6:
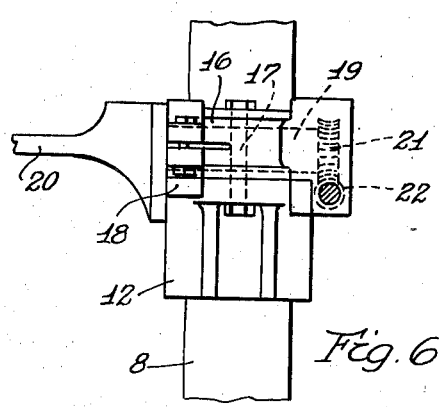
Fig. 6 is a section taken on the line 6—6 of Fig. 5.
Figure 9:
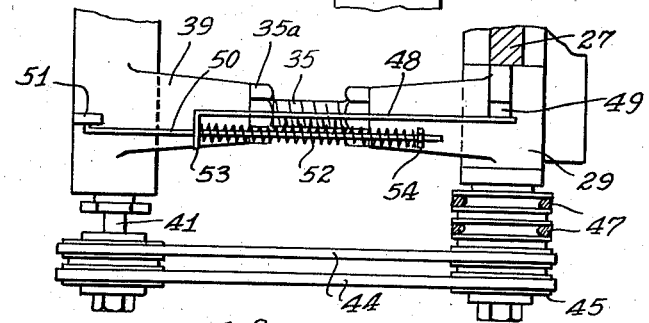
Fig. 9 is a fragmental plan of a detail.
Figure 7:
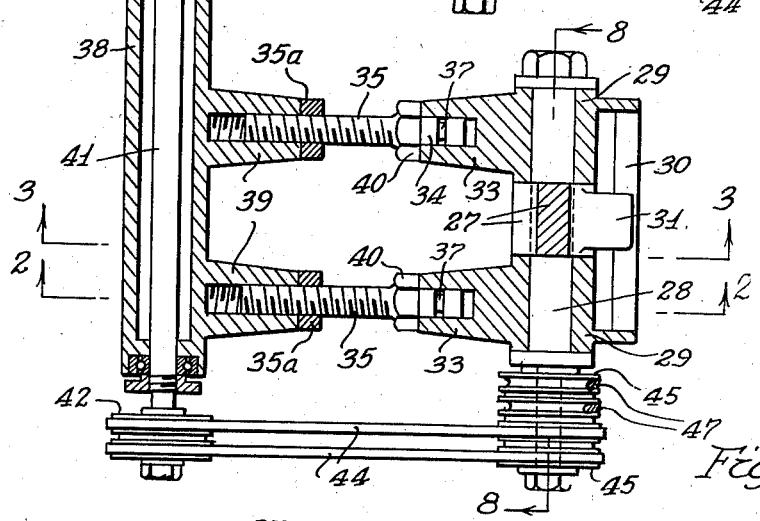
Fig. 7 is a section taken on the line 7—7 of Fig. 1.
Figure 8:
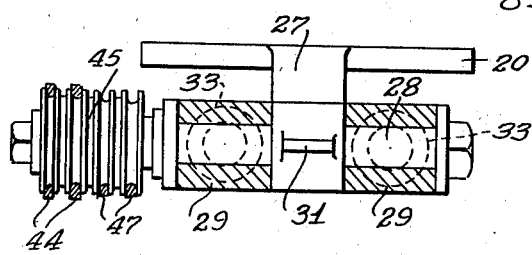
Fig. 8 is a section taken on the line 8—8 of Fig. 7.

The present machine includes a base 1 having a dove-tail guide 2 slidably receiving a dove-tailed end 3 block 4. In the upper portion of the block 4 is provided a dovetail 5, disposed at right angles to the guide 2, and slidably receiving a plate 6. The plate 6 and the block 4 have screws 7, such as are usually employed in this type of sliding arrangement, for causing relative movement of the elements for adjustment purposes.

Supported by the plate 6 is a vertical tubular post 8 having a screw 9 therein with a worm gear 10 adapted to be rotated by the manually operable worm gear 11. A slide member 12 is mounted upon the post 8, and has a portion 13 extending through a slot 14 in the post and screw threadedly engaging the screw 9. Engagement of the portion 13 with the sides of the slot 14 prevents rotation of the slidable element relative to the post, and engagement with the screw 9 results in vertical sliding movement of the element 12 upon manual rotation of the screw 9.

The sliding element 12 has a projecting bracket 15 upon which is secured a fixture 16, the fixture being secured by means of a substantially centrally disposed pin 17 which may be tightened to hold the fixture against movement when once placed in the desired location. The fixture 16 includes a clamping element 18 which receives a stud 19 for supporting a table 20, the stud having a worm gear 21 adapted to be rotated, when the clamping elements 18 are loose, by a manually operable worm 22. The table 20 is here illustrated as being horizontally disposed, but obviously it may be tilted, by the above described means, about the axis of the stud 19. When once placed in the desired location, however, the clamping elements 18 are tightened to hold the stud against accidental movement.

Supported at one end by pivot brackets 23, on the table 20, is a motor support 24, the free end of which is connected to the table 20 by an adjustable element 25, in order that it may be elevated or lowered for belt tightening purposes as will hereinafter appear. An electric motor 26 is mounted on the member 24.

Depending from the table 20 is a bracket 27 supporting a trunnion 28, and rotatable upon the trunnion 28 is a bracket having two aligned bearing portions 29 united by an integral transverse structure 30. As may be seen in Fig. 3, the bracket 27 has a projecting element 31 extending underneath the transverse formation 30 and adapted to engage the same to restrict rotation of the bearing members 29 relative to the trunnion 28. A set screw 32 is mounted in the formation 30 and may be adjusted to vary the restriction of rotation of the bearing members.

Each bearing member 29 has a radially extending socket 33 receiving a pilot 34 of a screw 35. The pilot of each screw is retained in its respective socket 33 by engagement of a set screw 36 engaging the walls of a groove 37 therein. A spindle support 38 has a pair of internally threaded sockets 39 receiving the ends of the screws 35. The screws have tool receiving portions 40 whereby they may be manually rotated to vary the distance between the trunnion 28 and the spindle support and lock nuts 35a are provided to engage the sockets 39. Rotatable in the spindle support is a spindle 41 having a pulley 42 on one end, and a polishing and buffing wheel 43 on the other end.

The trunnion 28, bearings 29, sockets 33 and 39, being connected by the screws 35 are analogous to a swinging arm, supporting the spindle 41 for swinging movement about the axis of the trunnion 28. The pulley 42 is connected by belts 44 to a four groove pulley 45 which is loosely journalled on the trunnion, and inasmuch as the spindle swings about the axis of the trunnion 28, the distance between the two pulleys 42 and 45 remains constant. Proper tension may be placed on the belts 44 by adjusting the screws 35 in their sockets 39. The motor 26 has a pulley 46 connected to the pulley 45 by belts 47, and the belts 47 may be properly tensioned by adjusting the screw 25 by which one end of the motor support 24 may be depressed or elevated.

In order to counterbalance the pivoted spindle support whereby it will remain in any desired position, and yield when the buffing wheel contacts work objects, a spring counterbalance is employed. The counterbalance comprises a yoke strap 48 pivotally attached to a bracket 49 on the depending bracket 27, and a rod 50 attached to a bracket 51 on the spindle support 38. A spring 52 is sleeved on the rod 50 and interposed between an eye 53 on the strap, and an adjustable nut 54 on the rod 50. The strap 48 and rod 50 are mounted above the spindle support and bearing 29 whereby the spring 52 tends to elevate the spindle. By adjusting the nut 54 the spindle support may be held at any desired elevation.

A similar strap 55 and rod 56 are connected beneath the depending bracket 27 and the spindle support 38, and have a spring 56a confined between an eye 57 and an adjustable nut 58 tending to pull the spindle downwardly. By adjusting the nut 58 the spring 56a may be regulated to cause any desired pressure between the wheel 43 and a work object.

What I claim is:

1. The combination of an arm mounted for oscillation about a fixed axis, a tool holding spindle mounted in said arm parallel to said axis, a pulley having a plurality of grooves concentric with said axis, a stationary motor support having a motor mounted thereon, means driving said pulley from said motor, means driving said spindle from said pulley, springing means supporting said arm against gravity at an angle with respect to the vertical, and springing means including the first named springing means opposing oscillation of said arm out of its selected position.

2. The combination as set forth in claim 1 wherein the resistance of all of said springing means is individually adjustable.

3. The combination of an arm mounted for oscillation about a fixed axis and having a tool holding spindle mounted for rotation therein, spring means positioning said arm against gravity, a stationary motor support having a motor thereon for driving said spindle, said arm being composed of a plurality of telescoping parts adjustable in length to vary the radius of oscillation thereof, and removable means connecting some of said parts, said last named means being removable to enable complete separation of the parts it connects while other of said parts are moved telescopically.

4. The combination of an arm mounted for oscillation about a fixed axis and having a tool holding spindle mounted for rotation therein, spring means positioning said arm against gravity, and a stationary motor support having a motor thereon for driving said spindle, said arm being adjustable in length, said motor support being adjustable toward and away from said axis.

5. A grinding machine comprising a standard, a table supported by said standard, manual means for elevating and lowering said table on said standard, a bearing member on said table, a motor support having one end connected to said bearing member and its other end adjustably connected to said table for adjustment toward and away therefrom, a motor mounted on said support, a second bearing member carried by said table, an arm having a spindle for grinding wheels and the like journalled therein, said arm being oscillably mounted on said second bearing member, a pulley coaxial with said second bearing member, means driving said pulley from said motor, and means driving said spindle by said pulley.

6. A grinding machine comprising a standard, a table supported by said standard, manual means for elevating and lowering said table on said standard, a bearing member on said table, a motor support having one end connected to said bearing member and its other end adjustably connected to said table for adjustment toward and away therefrom, a motor mounted on said support, a second bearing member carried by said table, an arm having a spindle for grinding wheels and the like journalled therein, said arm being oscillably mounted on said second bearing member, a pulley coaxial with said second bearing member, means driving said pulley from said motor, and means driving said spindle by said pulley, and spring means anchored at one end to said table and at its other end to said arm supporting said arm in angular position against gravity.

7. A grinding machine comprising a standard, a table supported by said standard, manual means for elevating and lowering said table on said standard, a bearing member on said table, a motor support having one end connected to said bearing member and its other end adjustably connected to said table for adjustment toward and away therefrom, a motor mounted on said support, a second bearing member carried by said table, an arm having a spindle for grinding wheels and the like journalled therein, said arm being oscillably mounted on said second bearing member, a pulley coaxial with said second bearing member, means driving said pulley from said motor, means driving said spindle by said pulley, spring means anchored at one end to said table and at its other end to said arm supporting said arm in angular position against gravity, and a second spring means cooperating with the first spring means yieldingly opposing oscillations by said arm.

8. The combination of a motor support, an arm pivoted at one end on said support and having a tool holding spindle rotatably mounted in the other end thereof, counterbalancing means for said arm, a motor on said support driving said spindle, said arm being formed of two parts having screwthreaded engagement enabling adjustment of the arm as to length and a third part connected to one of said parts by removable means, a base on which said motor support is mounted, and means for adjusting said motor support vertically and rotationally with respect to said base.

GUSTAVE A. CARLSON.